(12) United States Patent
O (10) Patent No.: US 7,088,964 B2
(45) Date of Patent: Aug. 8, 2006

(54) SINGLE CHIP RADIO WITH INTEGRATED ANTENNA

(75) Inventor: Kenneth Kyongyop O, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 533 days.

(21) Appl. No.: 10/677,704

(22) Filed: Oct. 2, 2003

(65) Prior Publication Data

US 2005/0113035 A1     May 26, 2005

Related U.S. Application Data

(60) Provisional application No. 60/431,603, filed on Dec. 6, 2002, provisional application No. 60/415,477, filed on Oct. 2, 2002.

(51) Int. Cl.
*H04B 1/35*     (2006.01)

(52) U.S. Cl. .................. 455/90.3; 455/575.1; 455/557; 455/558; 455/333; 343/700 MS; 257/725

(58) Field of Classification Search ............... 455/90.3, 455/575.1, 333, 558, 556.1, 557, 573, 575.7, 455/575.8, 572, 78, 82–88, 550.1; 333/17.3, 333/118, 124; 343/700 MS, 702, 850, 853; 257/728, 604, 624–625, 659, 664
See application file for complete search history.

(56) References Cited

U.S. PATENT DOCUMENTS 4,841,738 A  *  6/1989  Katsuki et al. ................ 62/160
4,890,150 A  *  12/1989  Vera et al. .................... 257/493
5,754,948 A       5/1998  Metze
5,903,820 A  *  5/1999  Hagstrom ...................... 455/82
6,078,791 A       6/2000  Tuttle et al.
6,243,012 B1 *  6/2001  Shober et al. ............ 340/572.7
6,424,315 B1     7/2002  Glenn et al.
6,480,699 B1 *  11/2002  Lovoi ......................... 455/41.2
6,483,427 B1 *  11/2002  Werb .......................... 340/10.1
6,483,719 B1 *  11/2002  Bachman ..................... 361/816
6,542,720 B1     4/2003  Tandy
6,815,739 B1 *  11/2004  Huff et al. ................... 257/275
6,842,144 B1 *   1/2005  Guo et al. ............. 343/700 MS
2004/0203478 A1* 10/2004  Scott ............................ 455/70
2004/0259604 A1* 12/2004  Mickle et al. .............. 455/572

FOREIGN PATENT DOCUMENTS

JP              03158296 A    *    7/1991

OTHER PUBLICATIONS

Floyd et al., "15 GHz Wireless Interconnect Implemented in a 0.18-μm CMOS Technology Using Integrated Transmitters, Receivers, and Antennas," 2001 VLSI Symposium on Circuits, 155-158, Kyoto, Japan, Jun. 2001.

(Continued)

*Primary Examiner*—Pablo N. Tran
(74) *Attorney, Agent, or Firm*—Akerman Senterfitt; Neil R. Jetter (57) ABSTRACT

A true single-chip radio for bidirectional wireless communications includes a bulk substrate, at least one integrated antenna, at least one transceiver, baseband circuitry and at least one filter all integrally formed in or on the substrate. The radio preferably includes a low-loss dielectric propagating layer disposed beneath the substrate to improve antenna gain. The integrated antenna can be an adaptive array for beamforming.

24 Claims, 10 Drawing Sheets

OTHER PUBLICATIONS

Floyd et al., "A 23.8-GHz SOI Tuned Amplifier," IEEE Trans. MTTS, 50:2193-2196, Sep. 2002.

Hung et al., "A 25.9-GHz Voltage-Controlled Oscillator Fabricated in a CMOS Process," 2000 VLSI Symposium on Circuits, 100-101, Honolulu, HI, Jun. 2000.

Wang, "A 50-GHz VCO in 0.25 µm CMOS," Tech. Digest of 2001 International Solid State Circuits Conference, San Francisco, CA, Feb. 2001.

Hung et al., "High Q Capacitors (> 150 @ 900 MHZ) Implemented in a CMOS Process for Wireless Applications," IEEE Transaction on MTT, 46:505-511, May, 1998.

* cited by examiner

SINGLE CHIP RADIO WITH INTEGRATED ANTENNA

CROSS-REFERENCE TO RELATED APPLICATIONS

This application claims the benefit of U.S. Provisional Application No. 60/415,477 entitled "SINGLE CHIP RADIO WITH INTEGRATED ANTENNA" filed Oct. 2, 2002, and U.S. Provisional Application No. 60/431,603 entitled "SINGLE CHIP RADIO" filed Dec. 6, 2002, the entireties of both are incorporated herein by reference.

STATEMENT REGARDING FEDERALLY SPONSORED RESEARCH OR DEVELOPMENT

The United States Government has certain rights to this invention pursuant to DARPA Contract No. N66001-03-1-8901.

FIELD OF THE INVENTION

The invention relates to a single chip radio including a radio transceiver subsystem along with one or more on-chip antennas, baseband processors and filter structures.

BACKGROUND

Figure 1:
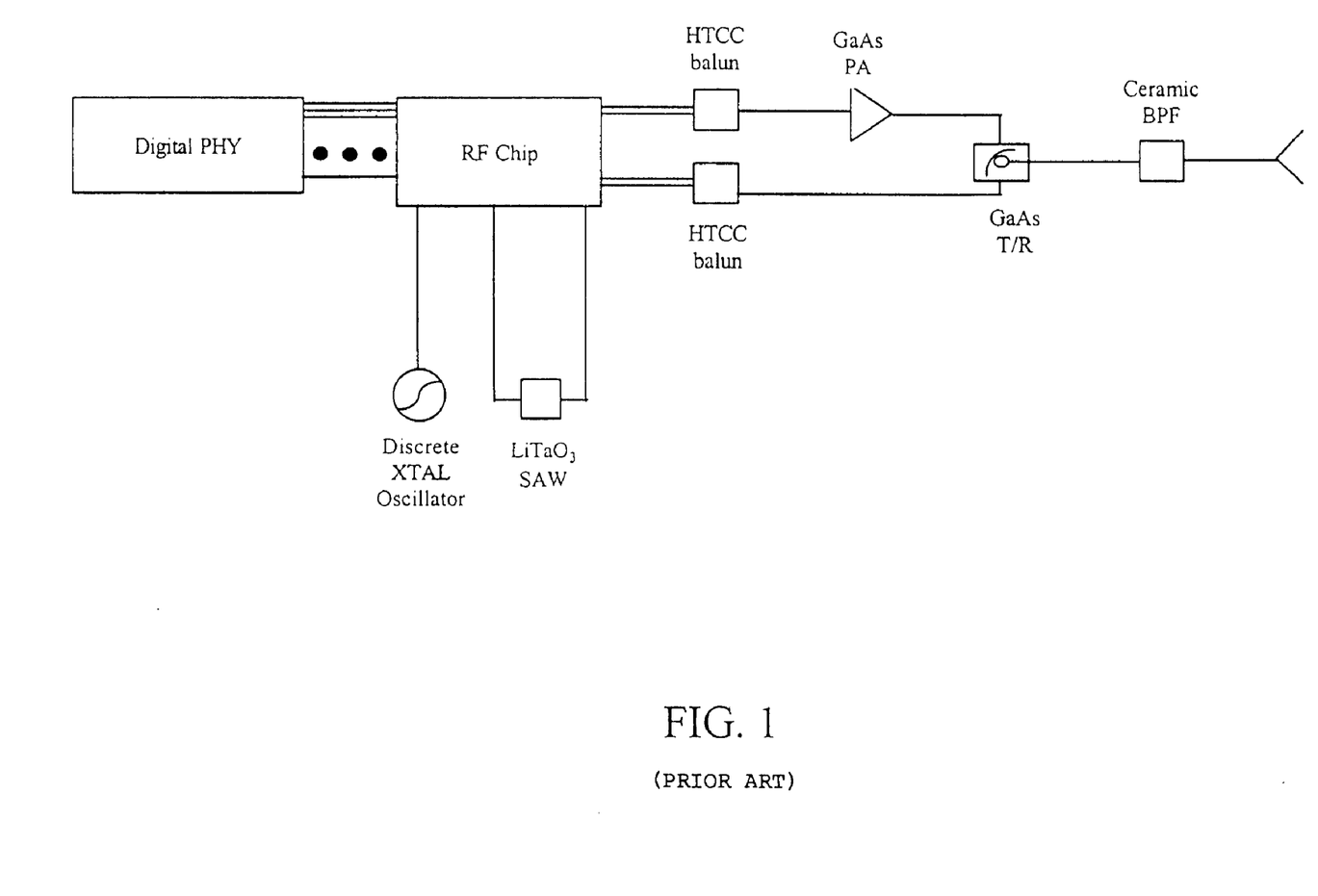
FIG. 1 illustrates a traditional prior art hybrid radio device which includes a plurality of separate chips to provide the necessary components.

High performance conventional radio designs incorporate optimized individual circuit components which are formed from different manufacturing processes. Among these components are gallium-arsenide-based power amplifiers (PAs) and transmit/receive (T/R) switches, ceramic-based RF filters, high-temperature ceramic-based baluns, lithium tantalate-based surface-acoustic-wave filters, crystal (XTAL) oscillators and digital physical-layer (PHY) chips that are all based on different material structures. For example, FIG. 1 shows a traditional prior art hybrid radio chip including a plurality of chips which are needed to realize the radio.

The drive to maximize radio performance generally leads to this type of hybrid multichip solution. However, hybrids result in high cost due to assembly, degraded reliability and increased power consumption mainly resulting from interconnection of the various circuit components, as compared to a hypothetical single chip radio. In addition to the above mentioned shortcomings of the hybrid radio approach, the hybrid approach necessarily produces a radio having a large footprint.

The realization of a practical fully integrated single chip radio has not seriously been considered until recently primarily because of the frequency limitations of the transistors combined with the required size of antenna structures to process these frequency limited signals. For example, transistors having $f_t$ values of about 10 GHz will generally permit RF circuit operation up to about 2.4 GHz. At 2.4 GHz the free space wavelength is 125 mm. Thus, on chip integration of a conventional resonant antenna, such as a half wave or quarter wave antenna, is clearly not practical as the chip would require dimensions of about 62.5, or 31.25 mm, respectively.

Using 2-mm long integrated antennas, wireless communication from one side of an IC to its other side at 15 GHz has been demonstrated by a group including the inventor using a 180 nm CMOS process [B. Floyd, C. M. Hung, and K. K. O, "15 GHz Wireless Interconnect Implemented in a 0.18-µm CMOS Technology Using Integrated Transmitters, Receivers, and Antennas," 2001 VLSI Symposium on Circuits, pp. 155–158, Kyoto, Japan, June 2001]. Furthermore, the inventor also participated in recent demonstrations of a 26 GHz tuned amplifier using 100 nm MOS transistors [B. Floyd, L. Shi, Y. Taur, I. Lagnado, and K. K. O, "A 23.8-GHz SOI Tuned Amplifier," IEEE Trans. On MTTS, vol. 50, issue 9, pp 2193–2196, September 2002 and 26 GHz and 50 GHz voltage controlled oscillators (VCO) [C. M. Hung, L. Shi, I. Lagnado, and K. K. O, "A 25.9-GHz Voltage-Controlled Oscillator Fabricated in a CMOS Process," 2000 VLSI Symposium on Circuits, pp. 100–101, Honolulu, Hi., June 2000], [H. M. Wang, "A 50-GHz VCO in 0.25 µm CMOS," Tech. Digest of 2001 International Solid State Circuits Conference, San Francisco, Calif., February 2001] in CMOS technologies. These demonstrations suggest that current CMOS technologies are starting to be capable of supporting RF circuits operating at 10 GHz and higher.

However, sufficiently fast transistors, amplifiers and oscillators alone are not sufficient to realize practical single chip radios. For example, any one the following challenges can limit the performance and prevent practical realization of a true single chip radio:

1. Low breakdown voltage resulting from small feature-size technology (e.g. 100 nm CMOS transistors) required for high frequency operation.
2. Parasitic coupling principally from one device to another through the common substrate. For example, coupling between the power amplifier to other analog circuits on-chip can be substantial because of the normally high signal level. Substrate noise coupling from digital circuits through the common substrate to the on-chip antennas can also be a problem.
3. Integration of low loss filters. For example, on-chip inductors tend to be lossy and provide Q's of no more than about 5.
4. Integration of a reference crystal or other oscillator.
5. Low integrated antenna gain. The dielectric surrounding integrated antennas tend to be lossy, such as moderately to heavily doped silicon substrates.
6. Adverse passivation effects on integrated antenna performance.
7. Adverse effects of metalization associated with integrated circuits which are disposed near integrated antennas. Nearby metalization can act to modify electromagnetic fields, such as by reflection, absorption and radiation.
8. Integration of bypass capacitors having sufficient capacitance to sufficiently shunt unwanted power supply noise to ground. Long leads from a remotely located battery can require large value capacitors, the large value capacitors requiring large areas for implementation.

In view of the many challenges noted above, it is not surprising that those in the art have generally considered the realization of a true single chip radio only a dream. Although many have referred to fabrication or design of radio subsystems as a "single-chip radio", such systems lack one or more important components for a true single chip radio, such as on-chip antennas and/or digital circuitry, such as digital signal processors.

For example, applied to telecommunications, the term "single-chip" has been used to generally refer to a hypothetical single telecom transceiver IC which would combine the RF front-end with the DSP core of the transceiver. However, even the realization of a fully integrated single-chip transceiver has proved elusive.

SUMMARY OF THE INVENTION

A true single-chip radio according to the invention can replace traditional hybrid radio designs which include a plurality of individual chips and discrete components. As used herein, the term "single chip" refers to an architecture where all radio functions in their entirety are simultaneously incorporated on a single semiconductor die, including the transceiver, integrated antenna(s), at least one filter, and baseband circuitry, such as one or more digital signal processors. A microcontroller is also preferably provided.

A single-chip radio for bidirectional wireless communications includes a bulk semiconducting substrate, at least one integrated antenna, at least one transceiver, baseband circuitry and at least one filter integrally formed in or on the substrate. The radio operates at a frequency of at least 2 GHz and higher. In a preferred embodiment, the radio includes a frequency upconverter in the transmit circuitry (e.g. mixer) to operate at a carrier frequency of at least 24 GHz, but can operate at higher frequencies as the speed of transistors advances in the future.

The radio can include a battery, such as a rechargeable battery. The battery can be formed on-chip. The single-chip radio can include at least one on-chip sensor, such as a MEMS sensor.

The radio can further comprise a package fully encapsulating the radio to form a packaged radio. The packaged radio can be configured as a high numbered hedron, or provide a weight distribution that strongly favors the radio landing face up when dropped in a random orientation.

The radio can further include a non-volatile memory integrally formed in or on the substrate. In addition, the radio can include at least one voltage controlled oscillator (VCO), synthesizer, low noise amplifier, power amplifier, mixer, microprocessor, baseband signal processor, A/D and D/A converter integrally formed in or on the substrate. The varactors comprising the VCO and/or filters preferably use the gate oxide thickness provided to high voltage input/output transistor structures on the substrate and the geometry provided to logic devices on the substrate. The bulk resistivity of the substrate is preferably at least 20 ohm-cm. The substrate can be silicon.

The radio preferably includes separate transmit and receive antennas. This removes the need for a transmit/receive switch. In this embodiment, the transmit antenna can provide an impedance less than 50 ohms and the receive antenna provides an impedance more than 50 ohms.

The radio can include at least one low-loss dielectric layer disposed beneath the substrate. The low-loss layer preferably provides a thermal conductivity of at least 35 W/m·K and electrical resistivity greater than 100 ohm-cm.

The radio can include a self-generating on-chip power source. For example, the self-generating on-chip power source can comprise a piezoelectric.

The radio can include passivation layer coating on the chip to improve its impedance match with the air. In this embodiment, the passivation layer can have a dielectric constant of at least 20, such as 100.

Higher antenna gains can be realized using thin substrates. In one embodiment, the thickness of the substrate is less than 250 μm. In another embodiment, the thickness of the substrate is less than 50 μm, such as 5 to 10 μm.

The single chip radio can utilize smart antenna technology. in one embodiment, the radio includes an array of integrated antennas for receiving signals and array processor for beamforming the receive signals and another array of integrated antennas for transmitting signals and an array processor for beamforming the transmitted signals.

The single chip radio can also be used for ultra-wide-band (UWB) communcations. Such a radio preferably includes an upconverter, such as a mixer. The upconverter frequency translates signals UWB signals to be transmitted to at least 10 GHz, and preferably at least 20 GHz, such as 24 GHz. This embodiment eliminates the need for a wideband antenna by upconverting the signal to higher frequency (e.g. 24 GHz) to make a wideband signal effectively a narrow band signal compared to the carrier.

Antennas are preferably balanced antennas, such as dipole antennas. In another embodiment, the antenna(s) are placed within 2 mm of an edge of the substrate. Placing antennas along the edge reduces loss associated with the silicon substrate, reduces impact on chip area, and in the case of a dipole antenna, reduces interaction among antennas exploiting the null in the radiation pattern along the dipole axis.

BRIEF DESCRIPTION OF THE DRAWINGS

A fuller understanding of the present invention and the features and benefits thereof will be accomplished upon review of the following detailed description together with the accompanying drawings, in which.

DETAILED DESCRIPTION OF THE INVENTION

As described herein, device design rules of 100 nm, or smaller, are used to realize a true single-chip radio which includes one or more on-chip "integrated" antennas, at least one transceiver, at least one filter, and baseband circuitry (e.g. at least one digital signal processor), all on chip. For example, 100 nm integrated circuit technology provides MOS transistors having $f_t$ values of about 100 GHz, or more. Such processes can support RF circuit operation at about 24 GHz.

At 24 GHz the free space wavelength is 12.5 mm. Thus, half wave or quarter wave on-chip antennas can be included on circuit designs on chips having reasonable die sizes. For example, the size of a quarter wave antenna is ~3 mm for a 24 GHz signal, which is much smaller than the size of many integrated circuits presently being used. As the technologies are further scaled, the maximum operating frequency is expected to increase, and should enable integration of even more compact antennas.

It may be possible to further reduce the size of on-chip antennas for a given operating frequency using loading techniques, such as coil loading, which have been previously applied to conventional non-integrated antennas, such as dipole antennas. Loading coils function by effectively increasing an electric length of an antenna, which permits decreasing the physical length of an antenna. As applied herein, coil loading may be accomplished using on-chip inductive coils. However, antenna loading generally reduces antenna bandwidth.

Although CMOS technology is generally preferred for the invention because of cost and since the most advanced digital technologies are available first as CMOS technology, the single chip is in no way limited to CMOS, as it can be practiced, for example, using bipolar or BIMOS technology as well. Although the substrate is generally described herein as being a silicon substrate, the substrate can be others including silicon on insulator (SOI), SiGe, or Silicon on Anything (SOA). SOA is a technique to transfer silicon wafer to a dielectric substrate, after the processing is completed. The invention can be used with a variety of integrated antenna types, such as zigzag, linear dipole, loop, slot and patch antennas.

The single chip radio does not require external transmission line connections. As a result, the single chip radio can be extremely small and lightweight.

In one embodiment of the invention, the single chip radio includes an on-chip oscillator. For example, U.S. Pat. No. 6,285,866 to Lee discloses a method of forming of a piezoelectric oscillator on-chip using a bonding and grinding process as an alternative to an off-chip crystal oscillator. Although Lee is entitled "Single-chip radio structure with piezoelectric crystal device integrated on monolithic integrated circuit and method of fabricating the same," Lee does not disclose or suggest several important components of a true single chip radio as described herein, such as integrated antennas.

A battery can be provided either on-chip or off-chip. The battery is preferably a solid state battery that is also rechargeable. In the case of a rechargeable battery, contactless charging operations known in the art, such as using inductive coupling, can be used to provide energy from an external power source to recharge the battery over the air provided appropriate reception devices are provided on the chip. This enables recharging to be performed even when the single chip radio and battery are fully encapsulated in a package.

As noted above, the battery can be on or off-chip. In the off-chip embodiment, only the battery is generally required in addition to the chip to configure the entire radio. For example, in the off-chip battery embodiment, a packaged single chip radio can incorporate all radio components including a transceiver, oscillator, memory, a variety of filters, a synthesizer, a low noise amplifier, a power amplifier, a mixer, a microprocessor, baseband signal processor (e.g. a signal digital processor), A/D, D/A converter and the off-chip battery in a 3 mm×3 mm×1 mm (9 mm$^3$ volume), and have a mass less than 20 milligrams. Battery life can be many days to many months depending on the duty cycle.

Alternatively, it may be possible to provide an on-chip battery. U.S. Published Application No. 20020001747 A1 to Jenson, et al. published Jan. 3, 2002 is entitled "Thin-film battery having ultra-thin electrolyte and associated method" discloses a method and system for fabricating solid-state energy-storage devices on a variety of substrates without the need for a high temperature annealing cycle. The disclosed method allows for the fabrication of ultra thin batteries which can be formed while metallization is present on the chip using standard integrated circuit processing.

An on-chip battery reduces inductance between the power supply and the communications circuitry. This can permit a reduction in the size of the bypass capacitor required to shunt unwanted power supply noise.

In one embodiment, a battery may not be necessary. For example, it may be possible to include a self-generating on-chip power source, such as a piezoelectric energy harvesting device as an alternative to a battery in suitable vibration providing environments.

Figure 2:
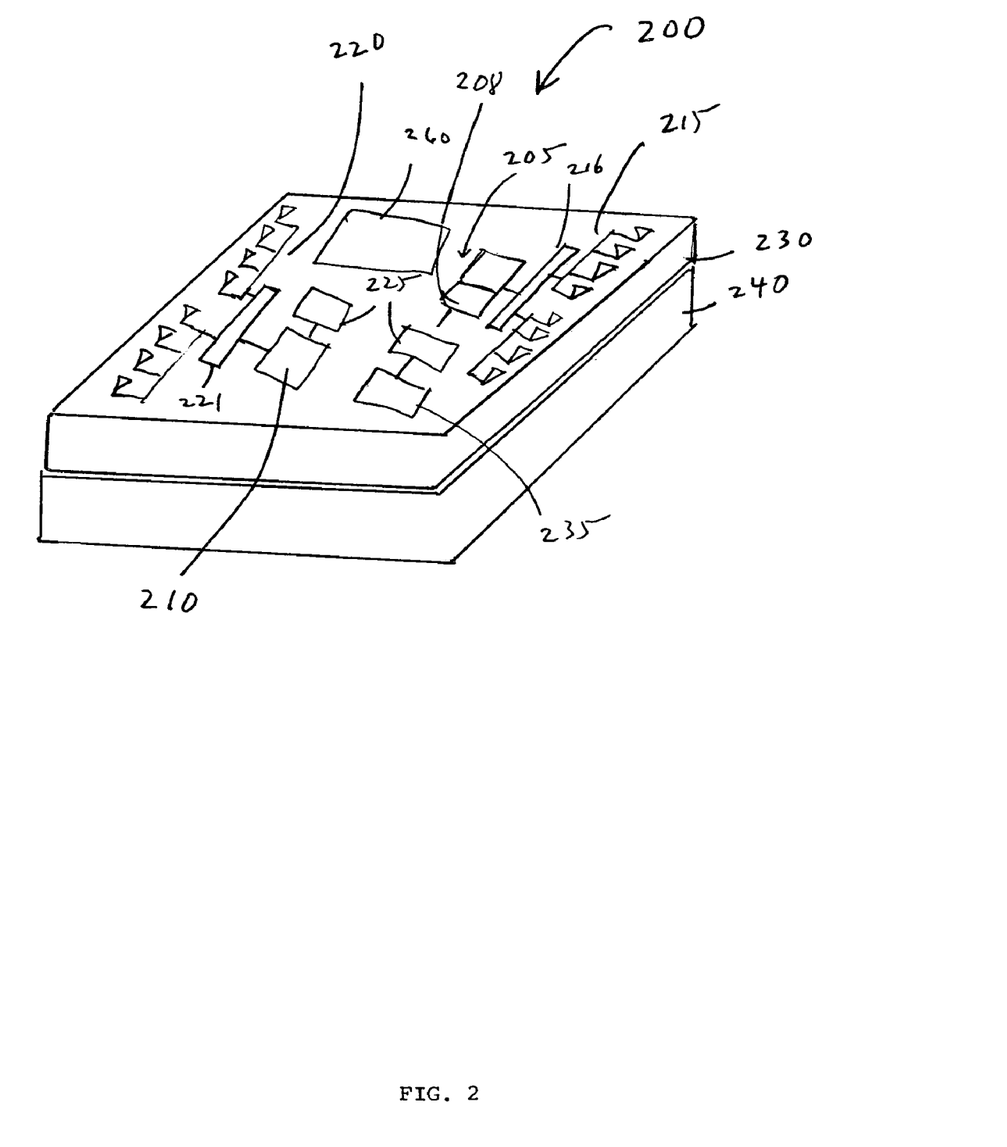
FIG. 2 illustrates a μ-node single-chip radio, according to an embodiment of the invention.

FIG. 2 illustrates a single-chip radio 200 according to one embodiment of the invention. The radio 200 is formed on a substrate 230 which includes transmit circuitry 205 and receive circuitry 210, each having their own integrated antennas arrays, 215 and 220, and array processors 216 and 221, respectively. The use of multiple antennas provided by antenna arrays 215 and 220 together with array processors 215 and 216 permits use of adaptive beam forming as known in the art.

Antennas comprising antenna arrays 215 and 216 are disposed near the edge of the substrate. Placing antennas along the chip edge reduces loss associated with wave attenuation due to the substrate (e.g. silicon), reduces the impact of integrated antennas on chip area. Generally, the antenna(s) are preferably placed within 2 mm of an edge of the substrate 230. However, the maximum preferred distance will vary based on frequency and substrate resistivity. For example, for a 24 GHz signal and a 20 ohm-cm Si substrate, the maximum preferred distance is 1 mm.

Transmit circuitry 205 includes upconverter 208, such as a mixer. The upconverter 208 frequency translates signals to be transmitted to at least 10 GHz, and preferably at least 20 GHz, such as 24 GHz. This embodiment eliminates the need for a wideband integrated antenna by upconverting the signal to higher frequency (e.g. 24 GHz) to make a wideband signal effectively a narrow band signal compared to the carrier. This embodiment is particularly helpful when the radio signals are UWB signals.

Ultra wideband technology (UWB), which is sometimes referred to as impulse radio which is one of its common forms. UWB signals have also come to signify a number of other terms, such as impulse, carrier-free, baseband, time domain, nonsinusoidal, orthogonal function and large-relative-bandwidth radio/radar signals. As used herein, the term "UWB" includes all of these.

UWB wireless technology provides very low power consumption (microwatts), virtual immunity from RF noise. UWB may also provide improved security over alternative communication methodologies. Significantly, UWB does not interfere with signals used by existing communication systems, such as cellular communication signals.

UWB is believed by many to have been first fully described in a series of patents including U.S. Pat. No. 4,641,317 and U.S. Pat. No. 5,363,108 to Larry W. Fullerton. A second generation of Fullerton UWB patents include U.S. Pat. Nos. 5,677,927, 5,687,169, 6,031,862. Fullerton also discloses use of UWB for position determination and distance measurements in U.S. Pat. Nos. 6,297,773 and 6,295,019, respectively.

For example, assume UWB signals range in frequency from 100 MHz to 3 GHz. This frequency range is nearly 5 octaves. Configuring suitable antennas to handle 5 octaves of signals raises difficulties. However, by upconverting the 100 MHz to 3 GHz signals to 21.1 GHz to 24 GHz reduces the frequency range to a fraction of an octave, thus facilitating antenna implementation.

The antennas comprising antenna arrays 215 and 220 are disposed along the edge of substrate 230. This arrangement reduce loss associated with the substrate, reduces the impact of the antenna on chip area, and when embodied as dipole antenna elements also reduces interaction among antennas exploiting the null in the radiation pattern along the dipole axis.

Although antenna arrays are preferred in certain applications, the invention can be practiced with as little as one integrated antenna where the antenna is shared by the receive and transmit circuitry. However, having separate receive antennas and transmit antenna eliminate the need for a transmit/receive switch required in single antenna embodiments. Radio 200 having separate antenna arrays 215 and 220 does not require a transmit/receive switch.

Baseband processors (e.g. DSP) 225 and sensor 235 are also included on substrate 230. An on-chip oscillator (not shown) is also included on substrate 230. A battery 240 is disposed beneath the substrate 230. The sensor 235 can be a MEMS sensor. A microcontroller 260 is also included. As noted earlier, although shown as an off-chip battery 240 in FIG. 2, the battery 240 can be formed on-chip.

Operation at 24 GHz and higher simplifies realization of a radio system with a bandwidth on the order of 1–2 GHz. Signals may be spread over this large frequency band or the band may be exploited to increase the processing gain to reduce detectability. Since a 1–2 GHz bandwidth is small (less than 10%) compared to the carrier frequency, the system acts as though it were narrow band. In comparison, conventional 2.5 or 5 GHz carrier radio technology would have great difficulty achieving 1–2 GHz bandwidth. This simplifies radio implementation in that unlike ultra-wide band radios operating near 3 GHz, broad band antennas and broad band matching are not needed, and standard established narrow band radio techniques and circuits can be utilized. However, this does not preclude implementation of single chip radio with a narrower band width operating with a lower carrier frequency.

With its extremely small size, the single chip radio can be covertly distributed with low probability of discovery, and can be used as an alternative to wire connections with minimum impact on mechanical design. This single chip radio is about 1/100th the size of projected Pico Radio nodes, and are on a par with Smart Dust optical nodes.

Being less than about 20 mg in mass fully integrated, radios according to the invention will offer weight savings versus wire connections required by prior art hybrid embodiments. Typical transmission distances using the invention are expected to be from 1 to 10 meters. For comparison purposes, a typical 1 meter long USB cable has a mass of more than 50 grams (cable and connectors). The mass of two single chip radios spaced at a 1 meter distance would be <40 mg versus the >50,000 mg wire option. This represents more than a 1250× weight/mass reduction.

Integration of entire radio functions into a single chip provides improved reliability, ease of use and reduced cost compared to the hybrid alternative comprising a multi-chip assembly bonded to an antenna, crystal, passive components, and power source. The cost will be lower than the cost of the several chips which are required in the hybrid approach. The cost of the external antenna, and external passive components is avoided, and unit assembly cost is greatly reduced. Because the component count and mechanical connections are reduced to a minimum, ruggedness and reliability significantly exceed that of the hybrid multi-chip assembly.

The single chip radio generally includes an RF subsystem comprising a radio transceiver along with one or more integrated antennas, filter structures, possibly phase shifters, along with digital components such as a baseband subsystem (e.g. DSP) and memory. The RF subsystem can be available as a core for insertion into specific chip designs which can be customized by information stored in the memory, which is preferably a non-volatile memory, or through selection of customized digital components and sensors.

Single chip radios can be used to support implementation of a variety of systems, such as novel military systems. For example, embedded in small protective packages a plurality of single chip radios can communicate in a cooperative manner to covertly retrieve data and pass it to a base station. Pairs of devices can be used to communicate data across moving or physically constricted regions in equipment such as a helicopter rotor, thus avoiding wiring reliability and/or weight problems. Electronic apparatus based on the invention can be carried by soldiers and eliminate awkward wiring between components. Wearable computers can be simplified. Personal communication devices can link to in-ear units without wires.

The invention is also suitable for other short distance radio applications. For example, cordless computer mice, keyboards, speakers and printers can utilize the invention. Wireless security and RFID applications are also comtemplated. Other exemplary applications include intra-system communications (such as car to car, or coffee machine to laptop), healthcare such as a in-body and diagnostic solutions, and intelligent home and vehicle communications (such as embedding in a wall to monitor environments, and car to car information sharing to improve traffic flow and safety.

Figure 3A:
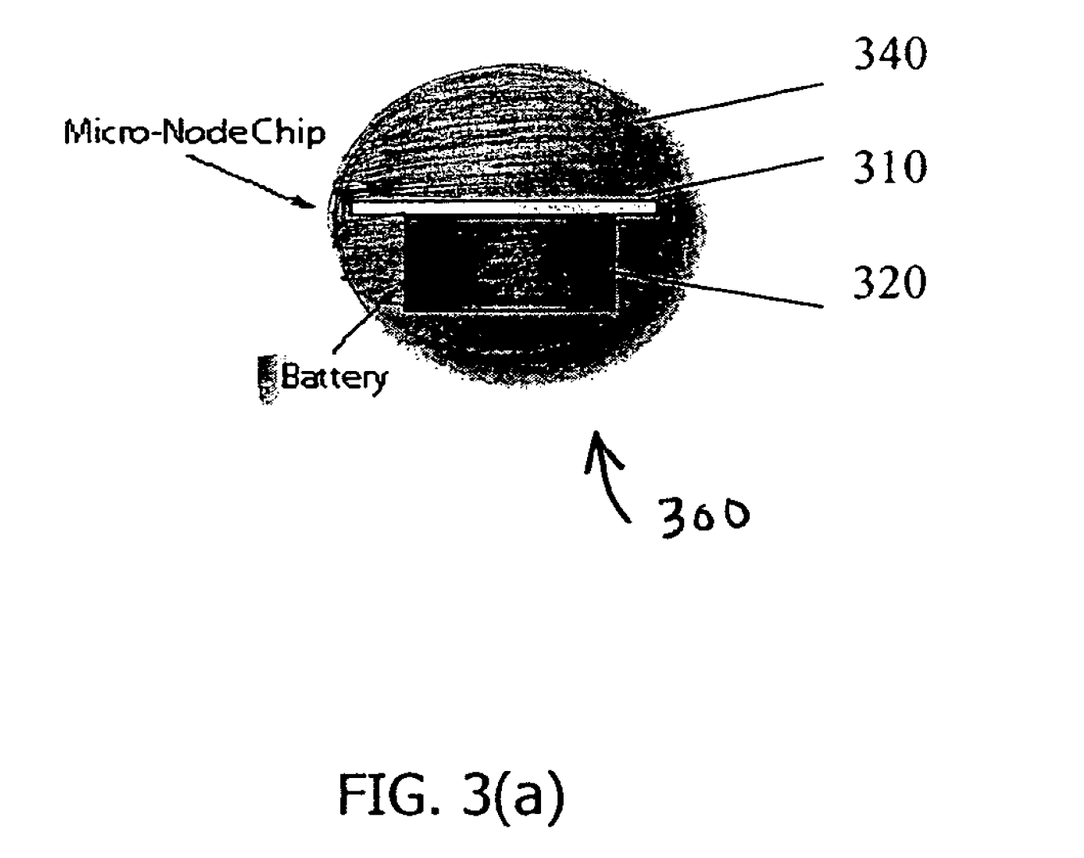
FIG. 3(a) shows an encapsulated μ-node "marble" according to an embodiment of the invention which provides a center of mass so that when the marble is thrown, the probability that the side containing the antenna facing up is highly favored.

FIG. 3(a) shows an encapsulated μ-node "marble" 300 which comprises a plastic package 340 encapsulating the μ-Node chip 310 along with an off-chip battery 320. This arrangement adjusts the center of mass of the μ-node "marble" 300 so that when the marble 300 is thrown, the probability that the topside of μ-Node chip 310 containing the integrated antenna (not shown) facing up is highly favored.

Figure 3B:
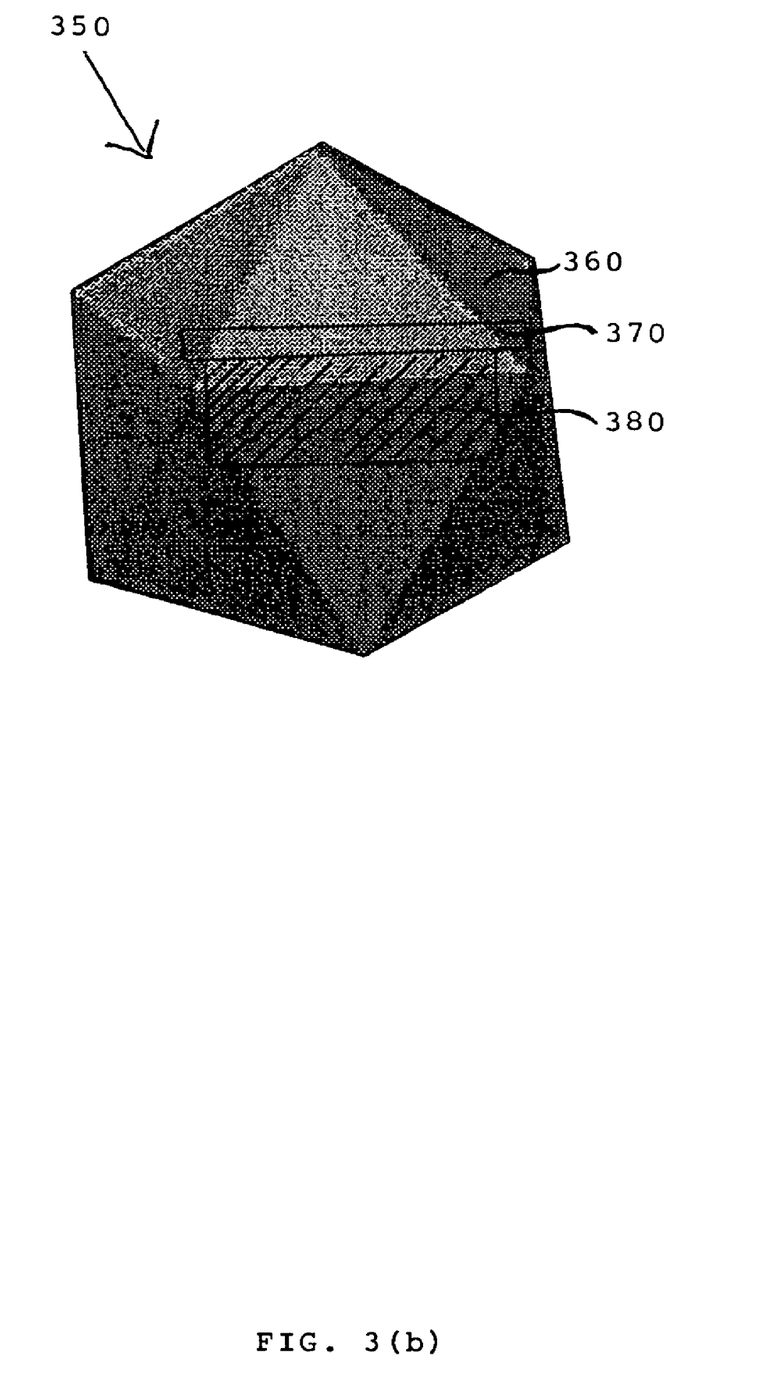
FIG. 3(b) shows μ-node "marble" according to another embodiment of the invention which includes a package configured as a high number hedron so that when the marble is thrown, the probability that the side containing the antenna facing up is highly favored.

FIG. 3(b) shows a μ-Node "marble" 350 which comprises a plastic package 360 encapsulating the μ-Node chip 370 along with an off-chip battery 380. Plastic package 360 is a decahedron which provides 10 faces. The high number hedron provided by package 360 strongly favors landing so that topside of μ-Node chip 370 containing the integrated antenna (not shown) facing up is highly favored.

When either marble 300 or 350 is thrown, the side containing the antenna facing up is the highly favored outcome. For example, using this aspect of the invention, listening devices would not have to be placed face up to optimize their performance as they would naturally have a strong likelihood of falling face up. The marble can collect information by itself or working with other marbles, and report back to a concealed base station. In turn, a more powerful base station can communicate with an airplane, satellite or other mobile communication site.

Ideally, the distance from an antenna to the communication circuitry is minimized. However, metal traces located too close to antenna can cause interference problems. In one embodiment of the invention, multiple antennas are integrated along the integrated circuit edges. Dipole antennas are preferred for this embodiment. Dipoles can be lined up along the perimeter of a die and have little interaction due to the nulls in the radiation pattern near neighboring dipoles in this arrangement. This can enable integration of antennas without substantially increasing die size and/or breaking routing channels in the inner portion of the integrated circuit.

The integrated antennas provided are preferably balanced antennas, such as dipoles, which require balanced feed structures. Although the current in a dipole antenna is unbalanced, the voltage in a dipole antenna is effectively balanced. For applications where antennas are located near or in ICs, the switching noise from digital circuits can interfere with the operation of antennas. Therefore, the integrated antennas are preferably balanced antennas which along with a differential or balanced feed structure can enable improved common-mode rejection of interference which can flow through the common IC substrate.

When Si substrates with a resistivity less than about 20 Ω-cm are used, the power transmission gain ($G_a$) of integrated antennas have been found to be significantly degraded due to conduction loss. Low resistivity substrates are commonly used for CMOS circuits to reduce latch-up susceptibility. Although, systems can be made to work with low substrate resistivity, it will require a larger transmitted power and dc power consumption. To address this issue, the invention can comprise use of substrates with resistivities ranging from 50 to 100 Ω-cm, or higher, use of alternate substrates, such as SOI which dispose a thin layer of semiconductor over a dielectric such as silicon dioxide or sapphire. Alternatively, conventional substrates can be thinned to a thickness on the order of 5 to 250 um to reduce the volume associated with lossy substrate in order to improve the power transmission gain ($G_a$).

Following thinning the wafer to the desired thickness, the wafer can be transfer to another support, including a package (e.g. plastic). The support is preferably a thin high permittivity dielectric material selected to provide low loss and isolation from the earth ground plane as well as possibly a battery in the frequency range of interest.

In one embodiment, a low loss dielectric propagating layer can be integrated between the battery formed with conductive materials and the antenna elements to provide isolation between the battery and propagated signal. When low resistivity substrates are used (e.g. <1 ohm-cm), the substrate can significantly degrade the performance of the radio. In this case, a separate low loss insert layer can be disposed between a thinned substrate (e.g. silicon) and the battery. In one embodiment, a low loss passivating layer encapsulates at least a portion of the single chip radio, the low loss dielectric thickness selected to match the environment (e.g. air).

Exemplary layers which can satisfy the above parameters include sapphire ($Al_2O_3$), diamond, AlN, and high resistivity silicon. For high resistivity silicon, for example at about 20 GHz, the silicon should generally have a resistivity of at least 20 ohm-cm, preferably at least 100 ohm-cm, and more preferably at least 1000 ohm-cm.

For applications where larger chips can be used, multiple antennas can be used to establish transmit and receive directionality. Use of multiple antennas can also increase the total power handling capability of the overall system. Using a method like this to increase power handling capability is of particular importance since the breakdown voltage of 100 nm transistors is generally around 1 V, which limits power handling capability of an individual amplifier.

Using the invention it is no longer necessary to force the antenna interface to be at 50 ohms, since 50 ohm transmission lines required for off chip interconnection are no longer needed.

Transmit and receive sections can be provided with separate integrated antennas. This can eliminate the need for a transmit/receive switch and provide a low insertion loss. Since separate antennas for receiver and transmitter are on-chip, the generally difficult chip to external antenna path (both impedance matching, T/R switching, loss through off-chip interconnects) is eliminated and the package design, complexity, and cost are significantly reduced. Furthermore, separate antennas for transmit and receive permit simultaneous transmission and reception of data, which can be compared to prior art devices including a MUX switch which cannot transmit and receive at the same time.

Significantly, the transmit and receive antennas and sub-circuits each can be optimized separately. For example, improved performance can be realized using an impedance less than 50 ohms for the transmit antenna and more than 50 ohms for the receive antenna. This will provide greater flexibility for designing and optimizing low noise amplifiers and power amplifiers. Specifically, the receive antenna can provide relatively high input impedance (more than 50 ohms) for improved impedance matching to downstream receive circuitry, such as a low noise amplifier (LNA). This can permit placing a bandpass filter (which can also perform impedance transform) between the LNA and antenna to result in higher selectivity and lower loss.

By using higher receive impedance levels, the impact of imperfection of the related integrated passive components is reduced. Using passive on-chip components in combination with the freedom to choose impedance levels allows integration of tunable band pass filters with loss of about 4 dB in a 1.6-GHz pass band, and a 40 dB bandwidth of about 6 GHz.

Regarding the transmit antenna and circuitry, signals to be transmitted are preferably run at high current to get reasonable power at low voltage, which requires low impedance levels. High current must be used since the maximum voltage possible is limited by the low breakdown voltage (e.g. 1 volt) provided by scaled (e.g. 100 nm or smaller) transistors.

Integration of on-chip filters requires high Q inductors and capacitors. Varactors are used to tune the filters. 100 nm CMOS technology generally provides 8 to 9 metal layers. Some of these layers will be highly electrically conductive metals, such as copper, which provide an electrical conductivity significantly higher than Al. Highly conductive metals in combination with the 24-GHz operating frequency will provide a great deal of flexibility for integration of inductors with a quality (Q) factor greater than 50.

Varactors are used for tuning filters and implementing low phase noise voltage controlled oscillators (VCO). A varactor is a semiconductor device (often a FET) in which the capacitance is sensitive to the applied voltage. A varactor can be formed by positioning an NMOS transistor in an n-well [C.-M. Hung, I-C. Wu, Y.-C. Ho, and K. K. O, "High Q Capacitors (>150 @900 MHz) Implemented in a CMOS Process for Wireless Applications," IEEE Transaction on MTT, vol. 46, no. 5, pp 505–511, May, 1998.]. This arrangement creates a short between the source, well and drain.

At 24 GHz, the varactor Q is expected to be about 30, which will limit the performance of filters and the VCO. When the frequency is increased beyond 24 GHz, the situation will become worse.

CMOS varactors are generally formed using design rules applicable for logic devices, as opposed to design rules for input/output (I/O) devices. Logic devices are generally significantly smaller than I/O devices, and use a thinner gate oxide.

To improve the Q of varactors, the invention provides several design approaches including patterning high voltage transistor structures with a lower capacitance/area using the finer line patterning available for low voltage (e.g. 100 nm) gate length transistors typically used for logic devices.

The Q of a varactor is proportional to $1/CR\omega$, where $\omega$ is the angular frequency. In a conventional CMOS process, the gate oxide is relatively thick for I/O devices and thin for logic devices. The maximum Q of the varactor formed from an NMOS device in an N-well is limited by n-well resistance and capacitance of the smallest varactor that can be defined in a given process technology. This is limited by the minimum dimensions allowed in a given technology. Larger varactors can be constructed by putting this smallest varactors in parallel while maintaining the maximum Q. Both capacitance and resistance should be as low as possible to achieve high Q. Thus, the invention uses the thicker gate oxide ordinarily used for I/O devices, with a short channel length. Short length provides low resistance, while thick gate oxide lowers capacitance. Operating frequency of varactors can be from hundreds of MHz to 100 GHz and higher.

Packaging for the single chip radio can be very simple, such as shown in FIGS. 3(a) and 3(b). In one embodiment, the only wire contacts inside the package are the two battery connections and possibly for those for an optional external crystal. In another embodiment which includes an on-chip battery and oscillator, there are no wire contacts inside the package. As noted above, inductive coupling can be used to recharge an encapsulated rechargeable battery.

A suitable package need only provide mechanical and chemical protection. In contrast, a device with an off-chip antenna must have a package that provides an impedance controlled RF wire connection and typically additional wire connections to a plurality of devices including external passive components.

The passivation layer is also preferably optimized. The thickness and permittivity of the coating layer (passivation) that is currently used for protecting the IC from the environment is selected to also improve the performance of the single chip radio. Passivation can coat the entire chip or only a portion thereof, such as the backside. The optimized coating layer parameters depend on the frequency range of operation for the single chip radio. For example, for 5.8 GHz operation, a passivation coating thickness of about a few mm's with a low loss material having a dielectric constant of at least 20, such as 100 can improve the impedance match of the antenna to free space. The matching works analogous to that of an anti-reflection coating. The antenna would see high dielectric constant coating, which would shorten the wavelength of the waves propagating therethrough. Shorter wavelength waves means a higher efficiency dipole antenna or the ability to reduce the length of the dipole antenna. At 24 GHz, such a coating will enable reduction of antenna size to below 1 mm.

EXAMPLES

Figure 4:
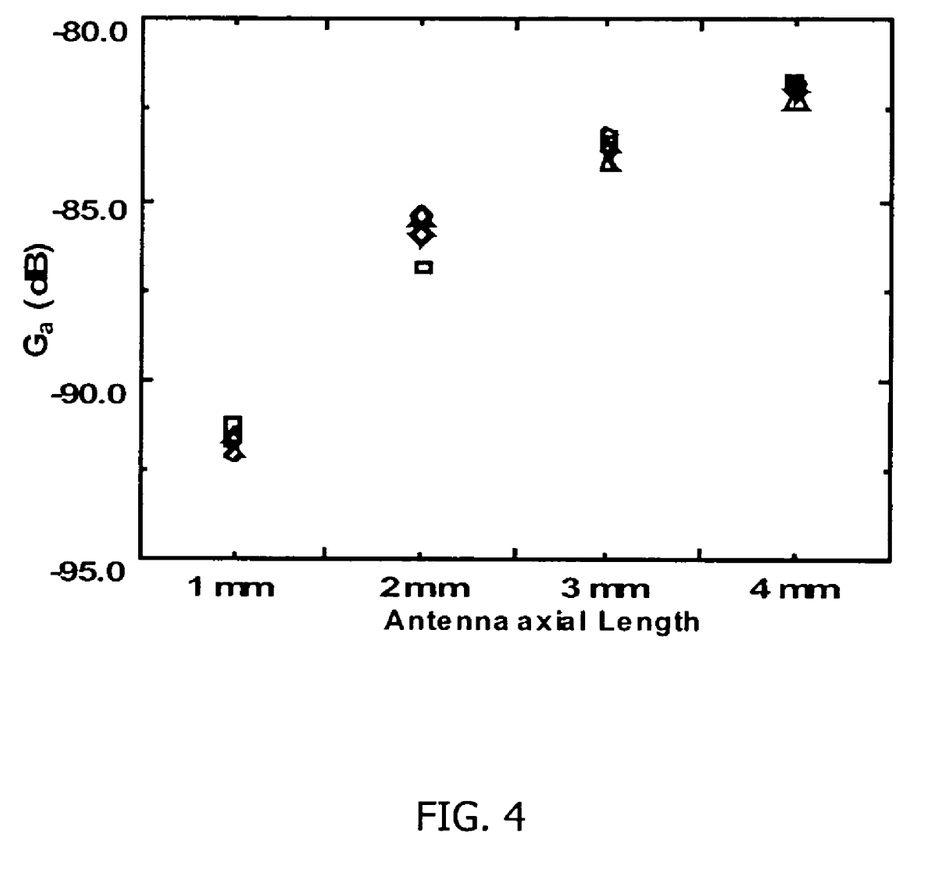
FIG. 4 shows the measured antenna gain vs. zigzag antenna axial length on a 20 ohm-cm Si substrate having a 3-μm oxide layer thereon. The separation distance between transmit and receive antennas was 1 meter.

It should be understood that the examples and embodiments described herein are for illustrative purposes only and that various modifications or changes in light thereof will be suggested to persons skilled in the art and are to be included within the spirit and purview of this application. The invention can take other specific forms without departing from the spirit or essential attributes thereof FIG. 4 shows the measured antenna gain ($G_a$) vs. zigzag antenna axial length on a 20 ohm-cm Si substrate having a 3-μm oxide layer thereon. The separation distance between transmit and receive antennas was 1 meter. As shown by the measurements, the 3-mm zigzag antenna has about 3 and 9 dB higher gain than 2 and 1-mm antennas, respectively, while having only about 1 dB lower gain than the 4-mm antenna. Thus, the 3-mm zigzag dipole antenna is a preferred choice for μNode applications as it fits the μNode size requirement.

Figure 5:
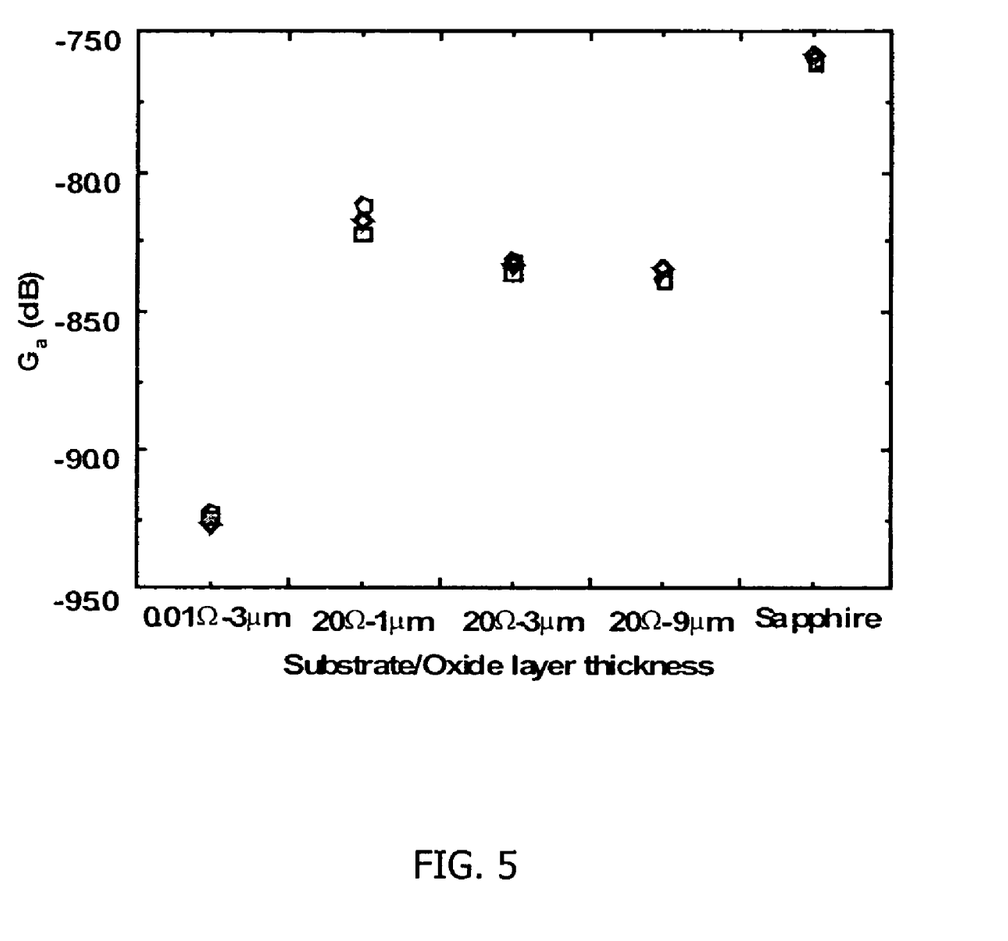
FIG. 5 shows the measured antenna gain vs. substrate resistivity and oxide thickness for 3-mm zigzag antenna pairs separated by 1 meter.

FIG. 5 shows the measured antenna gain vs. substrate resistivity and oxide thickness for 3-mm zigzag antenna pairs. The separation distance between the antenna pairs was 1 meter. The 3-mm zigzag antenna fabricated on a 20 ohm-cm substrate with a 3-μm oxide layer described relative to FIG. 4 was used as the transmitting antenna. The receiving antennas were fabricated on a 0.01 ohm-cm Si substrate with a 3-μm oxide layer, 20 ohm-cm wafers with 1, 3 and 9-μm oxide layers, and on a sapphire substrate. The sapphire substrate provided the highest $G_a$, and the 0.01 ohm-cm case has the lowest $G_a$. For the antennas on 20 ohm-cm substrates, $G_a$ of antennas on the 1-μm oxide layer was better than those on 3 and 9-μm ones. The penalty associated with using a 20 ohm-cm substrate is about 10 dB compared to using a sapphire substrate, which is a dielectric substrate. This example demonstrates that the $G_a$'S of on-chip integrated antennas are strongly dependent on the substrate resistivity. Higher substrate resistivity allows the on-chip integrated antennas to achieve higher transmission gain.

Figure 6:
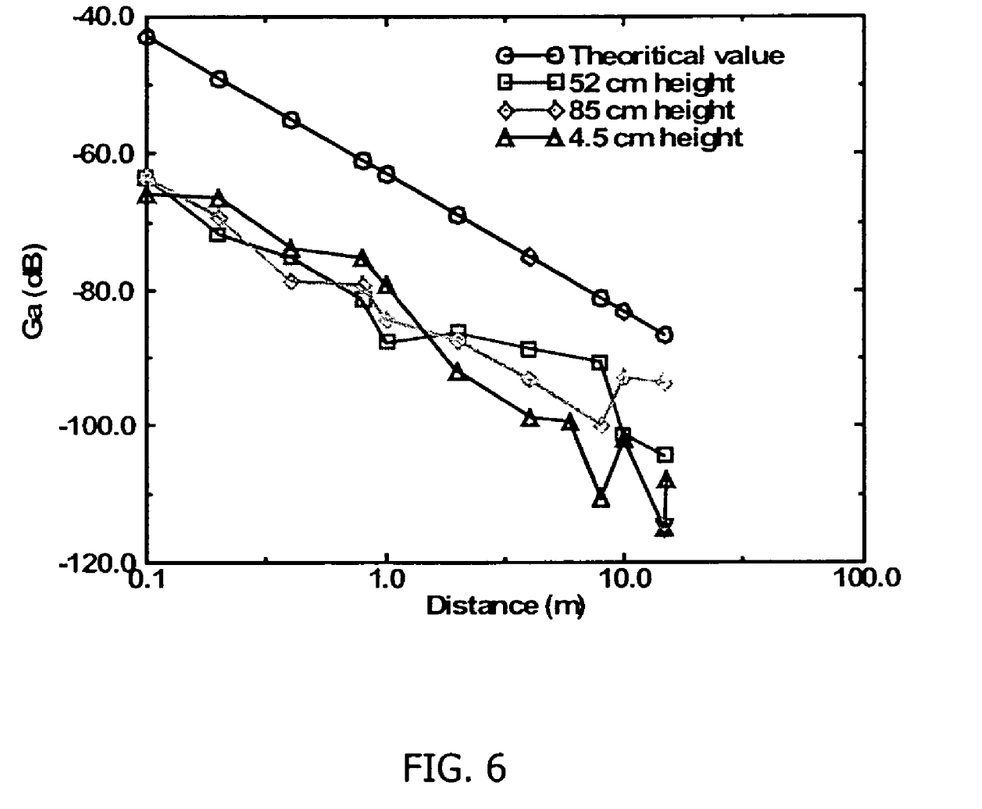
FIG. 6 shows plots of antenna gain versus antenna separations up to 15 m for three different heights between the antennas and floor. The distance (x-axis) is plotted on a logarithm scale.

FIG. 6 shows plots of $G_a$ versus antenna separations up to 15 m for three different heights between the antennas and floor. The distance (x-axis) is plotted on a logarithm scale. A theoretical $G_a$ curve for a pair of 3-mm linear dipole antennas transmitting and receiving in free space is also included in this FIG. for reference. The 3-mm on-chip antenna pairs have about 20 dB higher loss than the ideal 3-mm dipole pairs. $G_a$ approximately obeys the inverse square distance law up to 10 m, although some fluctuations due to the multiple path effects are seen at larger separations. $G_a$ between −90 and −95 dB at the 5 meter antenna pair separation is within the acceptable range for μ-Node applications.

Figure 7:
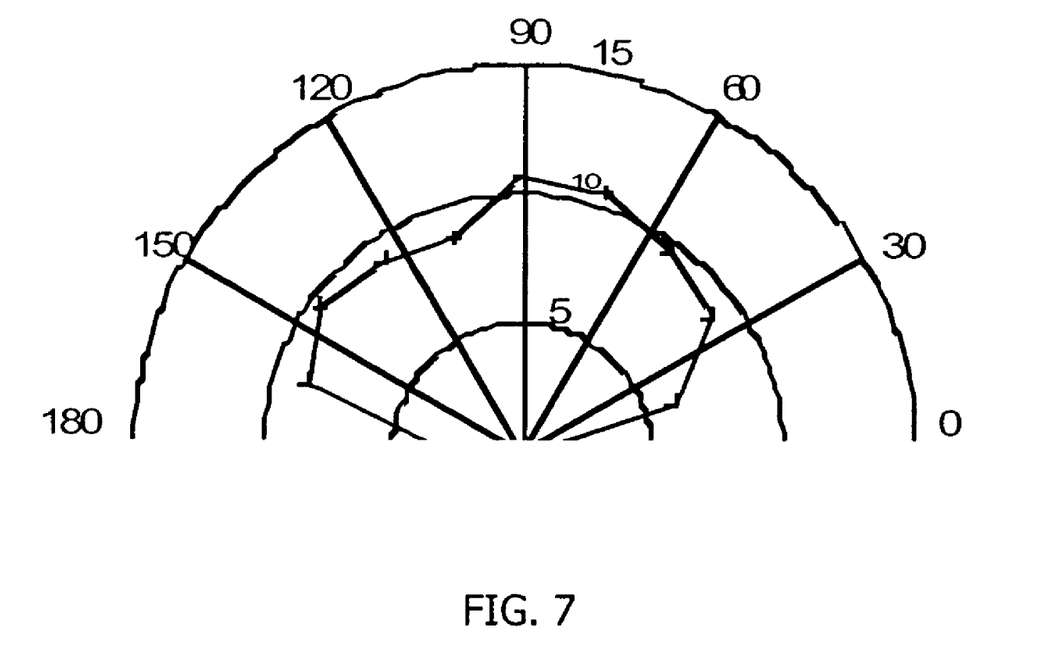
FIG. 7 shows a radiation pattern produced by a pair (transmit and receive) of 3-mm zigzag antennas separated by 1.7 m. The antennas were fabricated on 20 ohm-cm Si substrates with a 3-μm oxide layer.

FIG. 7 shows a radiation pattern produced by a pair (transmit and receive) of 3-mm zigzag antennas separated by 1.7 m. The antennas were fabricated on 20 ohm-cm Si substrates with a 3-μm oxide layer. The pattern shown in FIG. 7 is similar to that of a short dipole antenna in free space. $G_a$ varies around ±2 dB over about 120 degrees.

Figure 8:
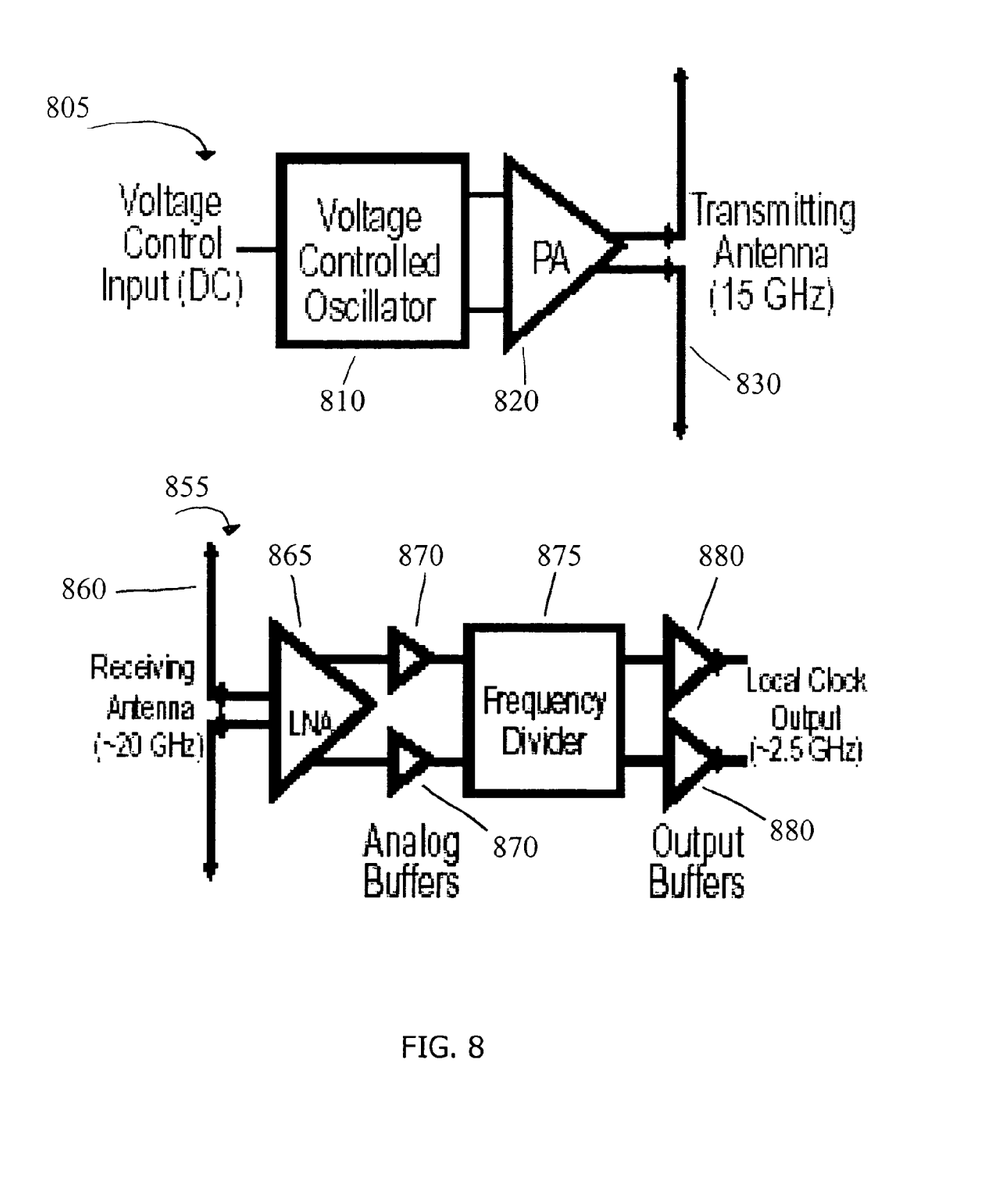
FIG. 8 shows a schematic of a transmitter circuit and receive circuit which included zigzag integrated dipole antennas which were used to demonstrate over the air communications.

A prototype single-chip radio system was fabricated and tested to demonstrate over the air communications between chips. One chip was configured as the transmitting chip, while another chip was configured as the receiving chip. Both chips were built on 20 ohm-cm Si substrates. FIG. 8 shows a schematic of the transmitter circuit 805 used which comprised a VCO 810, power amplifier 820 and 2-mm zigzag dipole transmitting antenna 830, all on a silicon substrate. The power transmitted from integrated antenna 830 was 20 dBm. The signal transmitted can be derived from an on-chip sensor (not shown), for example. The single chip receiver circuit 855 comprised a 2-mm zigzag dipole receive antenna 860, a low noise amplifier 865, analog buffers 870, (8:1) frequency divider 875 and output buffers 880. This setup was used to compile the radio communication data shown in FIG. 9 from chip to chip at 15 GHz over a distance of 40 cm.

Figure 9:
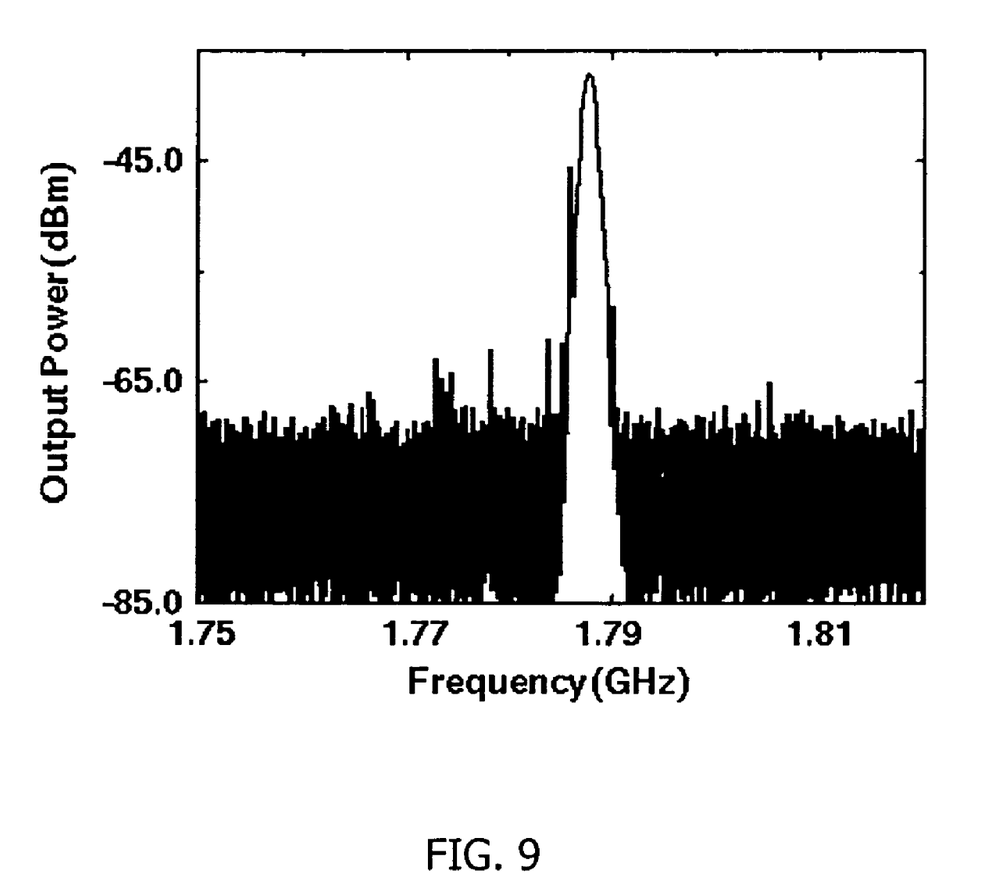
FIG. 9 shows the measured output spectrum provided by receive circuit shown in FIG. 8 after (8:1) frequency division. The 15 GHz transmitted signal provided by transmitter circuit shown in FIG. 8 can clearly be seen at about 1.78 GHz at a power of about −40 dBm.

FIG. 9 shows the measured output spectrum provided by receive circuit 855 after (8:1) frequency division. The 15 GHz transmitted signal provided by transmitter circuit 805 (shown in FIG. 8) can clearly be seen at about 1.78 GHz at a power of about −40 dBm.

It is to be understood that while the invention has been described in conjunction with the preferred specific embodiments thereof, that the foregoing description as well as the examples which follow are intended to illustrate and not limit the scope of the invention. Other aspects, advantages and modifications within the scope of the invention will be apparent to those skilled in the art to which the invention pertains.

All cited references above are incorporated in pertinent part by reference herein solely for the reasons cited in the above text.

I claim:

1. A single-chip sensor/radio for bidirectional wireless communications, comprising:
   a bulk semiconducting substrate, said substrate providing a bulk resistivity of at least 20 ohm-cm or being a thinned substrate having a thickness of 5 to 50 µm,
   a sensor, at least one integrated antenna, at least one transceiver, baseband circuitry, and at least one filter all integrally formed in or on said substrate,
   a package fully encapsulating said radio to form a packaged radio, wherein a weight distribution of said packaged radio favors said packaged radio landing face up when dropped in a random orientation,
   wherein data from said sensor is communicable over the air a distance of at least 40 cm to a remote site at a frequency of from 2 GHz to at least 15 GHz.

2. The single-chip radio of claim 1, wherein said radio further comprises at least one on-chip battery.

3. The single-chip radio of claim 1, further comprising a battery for powering said radio, wherein said battery is a rechargeable battery.

4. The single-chip radio of claim 1, wherein said distance is at least 5 m.

5. The single-chip radio of claim 1, wherein said sensor comprises a MEMS sensor.

6. The single-chip radio of claim 1, wherein said packaged radio is configured as a high numbered hedron.

7. The single-chip radio of claim 1, wherein said radio further comprises a non-volatile memory, said non-volatile memory integrally formed in or on said substrate.

8. The single-chip radio of claim 1, further comprising at least one voltage controlled oscillator (VCO), synthesizer, low noise amplifier, power amplifier, mixer, microprocessor, baseband signal processor, A/D and D/A converter integrally formed in or on said substrate.

9. The single-chip radio of claim 8, wherein at least one of said filter and said VCO comprises at least one varactor, wherein said varactor including a gate oxide thickness provided to high voltage input/output transistor structures on said substrate and a geometry provided to logic devices on said substrate.

10. The single-chip radio of claim 1, wherein a bulk resistivity of said substrate is at least 100 ohm-cm.

11. The single-chip radio of claim 1, wherein said at least one antenna comprises at least one transmit antenna and at least one separate receive antenna.

12. The single-chip radio of claim 11, wherein said transmit antenna provides an impedance less than 50 ohms and said receive antenna provides an impedance more than 50 ohms.

13. The single-chip radio of claim 1, further comprising at least one low-loss layer disposed beneath said substrate, wherein said low-loss layer provides a thermal conductivity of at least 35 W/m·K and electrical resistivity greater than 100 ohm-cm.

14. The single-chip radio of claim 1, further comprising a passivation layer coating on said integrated antenna, said transceiver, said baseband circuitry, and said filter, said passivation layer having a dielectric constant of at least 20.

15. The single chip radio of claim 1, further comprising a microcontroller.

16. The single chip radio of claim 1, wherein said integrated antenna comprises an array of said integrated antennas for receiving signals and array processor for beamforming said receive signals and an array of said integrated antennas for transmitting signals and an array processor for beamforming said transmitted signals.

17. The single chip radio of claim 1, further comprising an upconverter, said upconverter frequency translating signals to be transmitted to at least 10 GHz.

18. The single chip radio of claim 1, wherein said antenna is placed within 2 mm of an edge of said substrate.

19. The single chip radio of claim 1, wherein said antenna is a balanced antenna.

20. The single chip radio of claim 1, wherein said data is unidirectionally communicable for said distance.

21. A single-chip receiver for wireless communications, comprising:
   a bulk semiconducting substrate, said substrate providing a bulk resistivity of at least 20 ohm-cm or being a thinned substrate having a thickness of 5 to 50 µm,
   at least one integrated antenna, at least one receiver, baseband circuitry, and at least one filter all integrally formed in or on said substrate,
   a package fully encapsulating said radio to form a packaged radio, wherein a weight distribution of said packaged radio favors said packaged radio landing face up when dropped in a random orientation.

22. The receiver of claim 21, wherein said packaged radio is configured as a high numbered hedron.

23. The receiver of claim 21, wherein said integrated antenna comprises an array of said integrated antennas for receiving signals and an array processor for beamforming said receive signals.

24. The receiver of claim 21, further comprising at least one low-loss layer disposed beneath said substrate, wherein said low-loss layer provides a thermal conductivity of at least 35 W/m·K and electrical resistivity greater than 100 ohm-cm.

* * * * *